United States Patent
Kitada et al.

(10) Patent No.: US 7,940,408 B2
(45) Date of Patent: May 10, 2011

(54) BI-DIRECTIONAL STATUS AND CONTROL BETWEEN IMAGE CAPTURE DEVICE AND BACKEND DEVICE

(75) Inventors: Hiroshi Kitada, Tuckahoe, NY (US); Lana Wong, Randolph, NJ (US)

(73) Assignees: Ricoh Company, Ltd., Tokyo (JP); Ricoh Corporation, West Caldwell, NJ (US)

( * ) Notice: Subject to any disclaimer, the term of this patent is extended or adjusted under 35 U.S.C. 154(b) by 1448 days.

(21) Appl. No.: 11/386,578

(22) Filed: Mar. 21, 2006

(65) Prior Publication Data

US 2007/0223031 A1    Sep. 27, 2007

(51) Int. Cl.
*G06F 3/12* (2006.01)
*G06K 15/00* (2006.01)
*H04M 11/00* (2006.01)

(52) U.S. Cl. ............... 358/1.15; 358/1.13; 358/1.16; 379/100.06

(58) Field of Classification Search ............. 358/1.15, 358/1.16, 1.13, 1.9, 1.2, 403, 405; 379/100.01, 379/100.06
See application file for complete search history.

(56) References Cited

U.S. PATENT DOCUMENTS

| | | | |
|---|---|---|---|
| 5,220,674 A * | 6/1993 | Morgan et al. | 709/223 |
| 5,323,393 A | 6/1994 | Barrett et al. | |
| 5,689,625 A | 11/1997 | Austin et al. | |
| 5,781,711 A | 7/1998 | Austin et al. | |
| 6,020,973 A * | 2/2000 | Levine et al. | 358/1.15 |
| 6,269,380 B1 * | 7/2001 | Terry et al. | |
| 6,545,768 B1 * | 4/2003 | Matsubara et al. | 358/1.15 |
| 2003/0011633 A1 * | 1/2003 | Conley et al. | |
| 2003/0217095 A1 * | 11/2003 | Kitada et al. | |
| 2003/0233437 A1 * | 12/2003 | Kitada et al. | |
| 2004/0024811 A1 * | 2/2004 | Kitada et al. | |
| 2004/0215671 A1 * | 10/2004 | Hyakutake et al. | |
| 2006/0184644 A1 | 8/2006 | Kitada et al. | |
| 2006/0190622 A1 | 8/2006 | Kitada et al. | |

FOREIGN PATENT DOCUMENTS

| | | |
|---|---|---|
| EP | 0602787 A2 | 6/1994 |
| WO | WO03/009131 A2 * | 1/2003 |
| WO | WO2005057362 A2 * | 6/2005 |

OTHER PUBLICATIONS

Aug. 2, 2007 European Search Report in connection with corresponding European patent Application No. 07 10 4518.

* cited by examiner

*Primary Examiner* — Thomas J Lett
(74) *Attorney, Agent, or Firm* — Cooper & Dunham LLP

(57) ABSTRACT

Apparatuses and methods are provided for bi-directional status and control between image capture devices and backend devices in a document processing system.

31 Claims, 16 Drawing Sheets

Fig. 7(g)

Fax Document :

| Search | Folder View | Root | | Reset | Cancel | OK |

Root
    Hiroshi Kitada (P) 91-973-244-2683
    Hiroshi Kitada (A) 91-973-882-2236
    Lana Wong (P) 91-973-882-5962
    Lana Wong (A) 91-973-882-2236
    Mahesh Bhide (P) 91-973-882-2236
    Mahesh Bhide (A) 91-973-882-5862
    T-GROUP (Gr)

Fig. 7(h)

Fax Document :

| Search | Folder View | Root | | Reset | Cancel | OK |

Root
    Hiroshi Kitada (P) 91-973-244-2683
    Hiroshi Kitada (A) 91-973-882-2236
    Lana Wong (P) 91-973-882-5962
    Lana Wong (A) 91-973-882-2236
    Mahesh Bhide (P) 91-973-882-2236
    Mahesh Bhide (A) 91-973-882-5862
    T-GROUP (Gr)

Hiroshi Kitada (P) 91-973-244-2683

Fig. 7(i)

GlobalScan™ Scan To Fax Document     Doc Name    Logout

| Fax Document | Email | Scan To Folder | Scan Settings | Job Log |

Input Data Summary:      Reset Form

- Phonebook
- Fax Number
- Fax Note
- Billing Code 1
- Billing Code 2

Hiroshi Kitada (P) 91-973-244-2683

Fig. 7(w)
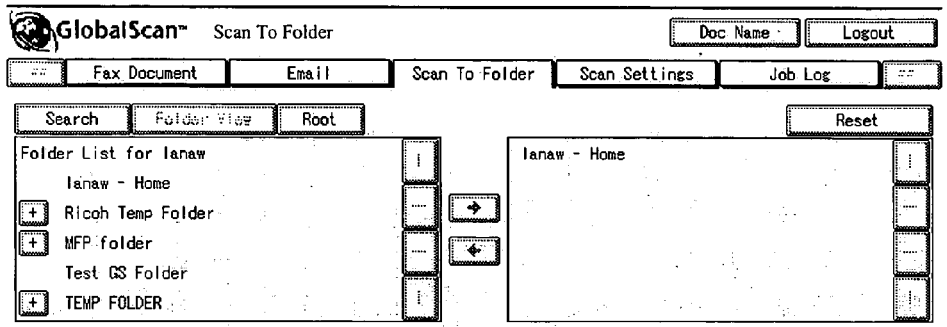
Fig. 7(x)
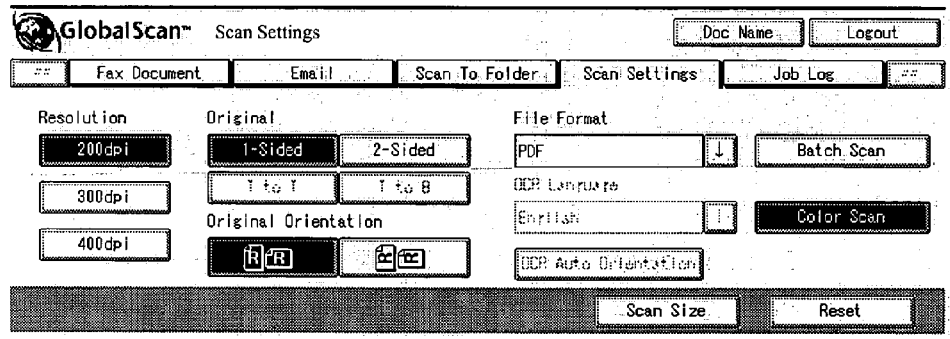
Fig. 7(y)
| Sender | Date/Time | Document Name | Pages | Status |
|---|---|---|---|---|
| lanaw | Jan.13 10:40 AM | 20060113104006 | 1 | P_jobRAD7597 |
|  | Jan.12 3:54 PM | 20060112155430 | 2 | P_jobRADDBE9 |
| gstest001 | Jan.12 2:04 PM | 20060112140343 | 4 | P_jobRAD3EA1 |
| gstest001 | Jan.12 1:27 PM | 20060112132625 | 3 | P_jobRAD9226 |
| gstest001 | Jan.12 1:16 PM | 20060112131549 | 2 | P_jobRAD3980 |
page: 1/18

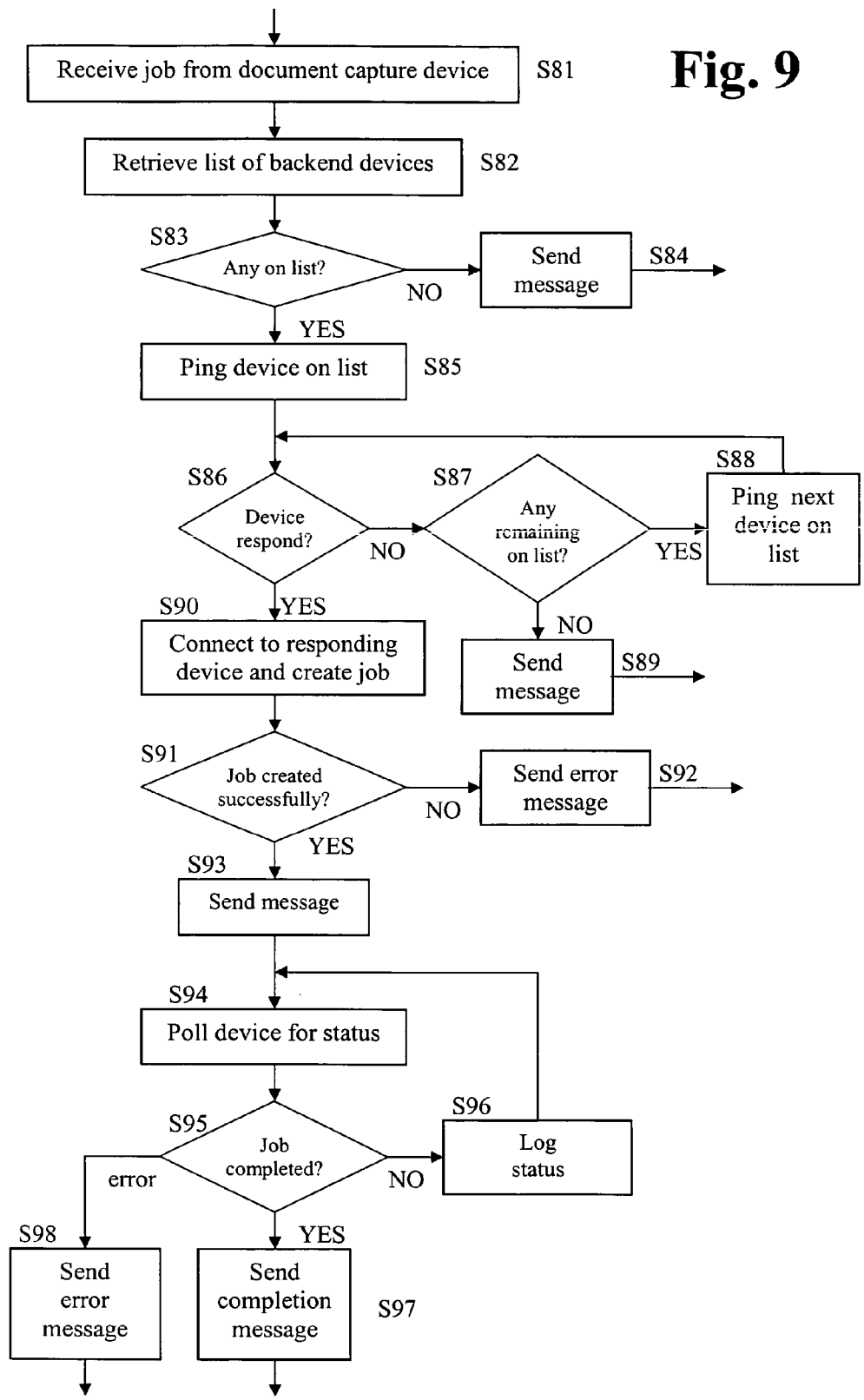

BI-DIRECTIONAL STATUS AND CONTROL BETWEEN IMAGE CAPTURE DEVICE AND BACKEND DEVICE

TECHNICAL FIELD

This disclosure relates to routing of document processing jobs to backend processing devices. In particular, the disclosure relates to techniques enabling bi-directional status and control between an image capture device which transmits a document processing job and a backend device.

DESCRIPTION OF RELATED ART

In the current information age, there is a regular need on an organizational level (for example, in a corporation or other commercial enterprise, a governmental agency, other public or private organizations, etc.) for efficient management of the enormous quantity of documents generated and disseminated, often across geographically distributed distances.

Information technology (IT) has provided means for improving productivity in the workplace. Many IT tools (or applications) have been proposed for capturing, distributing, storing, retrieving and managing information.

In recent times, the number and types of document-related network applications (that is, available over a data communication network, such as a wide area network, an intranet, an internet, etc.) have been increasing. Such applications can include document management systems (for example, for storing, organizing and managing documents of various contents, such as medical, legal, financial, marketing, scientific, educational, etc.), delivery systems (such as e-mail servers, facsimile servers, etc.), document processing systems (such as for format conversion and optical character recognition), directory services, etc. Such applications are referred to as backend applications (or devices).

Various systems for accessing these network applications from image capture devices (for example, scanners, printers, digital copy machines, multi-functional peripheral devices, computer systems with scanner functionality, cameras, etc.) have been contemplated.

One proposed system associates each image capture device with a corresponding computer for managing the documents with the network applications. The computers communicate with the various network applications to enable the use of these applications from an image capture device.

Such a system has, however, a number of drawbacks, particularly if considered within an environment of a relatively large office or widely spanning enterprise with numerous image capture devices and different kinds of network document applications which may change over time. Specifically, the requirement of having each image capture device associated with a corresponding computer is costly and creates a burden of maintenance, security, upgrade and customization that is multiplied by the number of computers. For example, when a new application or a customized feature is integrated within the system, each computer must be updated and made compatible with the new network application or customized feature. In addition, each computer can be a point of entry for a security threat.

In another system, it has been proposed to share a network computer amongst a small number of (for example, a computer in such a system includes the capability to change the presentation and content, during run time, of the user interface dynamically at the image capture device. However, the network computer in such a system maintains its connection through the data communication network with the image capture device from the time a document processing job is submitted from the image capture device, through the time the job is transmitted to the backend device, until the backend device acknowledges receipt or completes the job. Since such a continuous connection occupies a significant portion of the resources of the computer, the computer can only serve a small number of image capture devices. Thus, a typical enterprise environment will require several such computers. Further, such a configuration can slow down the data communication network through which the image capture devices connect to the computers. In addition, if such a computer is connected to a large number of image capture devices, the handling of plural received jobs will often result in an unacceptably long delay before the image capture devices receive confirmation from the computer of receipt, and can place the computer in a virtual standstill.

Document routing servers are available commercially for routing document processing jobs from image capture devices to backend devices. A document routing server can conventional document routing server generally do not relay job status information from a backend device to an image capture device. Further, a job submitted by the image capture device in some instances may fail, typically not because the document to be processed is defective, but rather the accompanying information (such as index information, processing instructions, etc.) is unacceptable. Conventional document routing servers typically do not provide the image capture device with additional processing options to allow the defect to be corrected. Further, the image capture device typically deletes from storage the document to be processed once the document routing server acknowledges receipt of the document processing job, and therefore the document must be rescanned or otherwise captured again. Therefore, a new job including the document to be processed must be submitted from the image capture device.

There remains a need for a job distribution apparatus which can serve a scalable number of image capture devices, to distribute document processing jobs to any of assorted backend devices, as well as enable bi-directional status and control between an image capture device and a backend device.

SUMMARY

A job distribution apparatus that enables bi-directional status and control between image capture devices (such as multi-functional peripheral (MFP) devices) on the one hand and backend devices on the other hand is discussed herein.

In addition, a document processing system comprising the job distribution apparatus, one or more image capture devices, and one or preferably more backend devices is discussed in this disclosure.

Methods for bi-directional status and control between image capture devices and backend devices through a job distribution apparatus (or node) are also discussed herein.

In one example, a document processing job from an image capture device is transmitted through a first connection between the image capture device and a job distribution apparatus through a data communication network. The job distribution apparatus routes the document processing job to a specified backend device, and allows the first connection to terminate without waiting for acknowledgement or completion of the document processing job by the specified backend device. After the job distribution apparatus is informed by the backend device of the status of the document processing job, the job distribution apparatus transmits status information to the image capture device through a second connection between the image capture device and the job distribution apparatus.

In another example, if the document processing job fails, a notice that the document processing job has failed is transmitted from the job distribution apparatus to the image capture device. The image capture device is provided further processing options, such that the image capture device can submit additional processing information, without resubmitting the document to be processed.

The asynchronous approach of the techniques of this disclosure allows the document processing system to be highly scalable. That is, a job distribution apparatus can serve a large number of image capture devices, without being overloaded. In contrast to conventional systems in which a connection between an image capture device and a document processing server is maintained until the backend device has completed the document processing job submitted by the image capture device, the connection between the image capture device and the job distribution apparatus is terminated once the document processing job is received by the job distribution apparatus. The job distribution apparatus routes the job to a backend device and proceeds to handle the next job received from an image capture device without waiting for acknowledgement or confirmation from the backend device regarding the first job. Therefore, the job distribution apparatus is not hampered by the burden of maintaining connection to image capture devices while waiting for jobs submitted by the image capture devices to be completed by the backend devices to which the jobs have been routed.

BRIEF DESCRIPTION OF THE DRAWINGS

The features of the present application can be more readily understood from the following detailed description with reference to the accompanying drawings wherein:

FIG. 9 shows a flow chart for an example of a process for processing a document processing job through one of plural backend devices.

DETAILED DESCRIPTION

Figure 1:
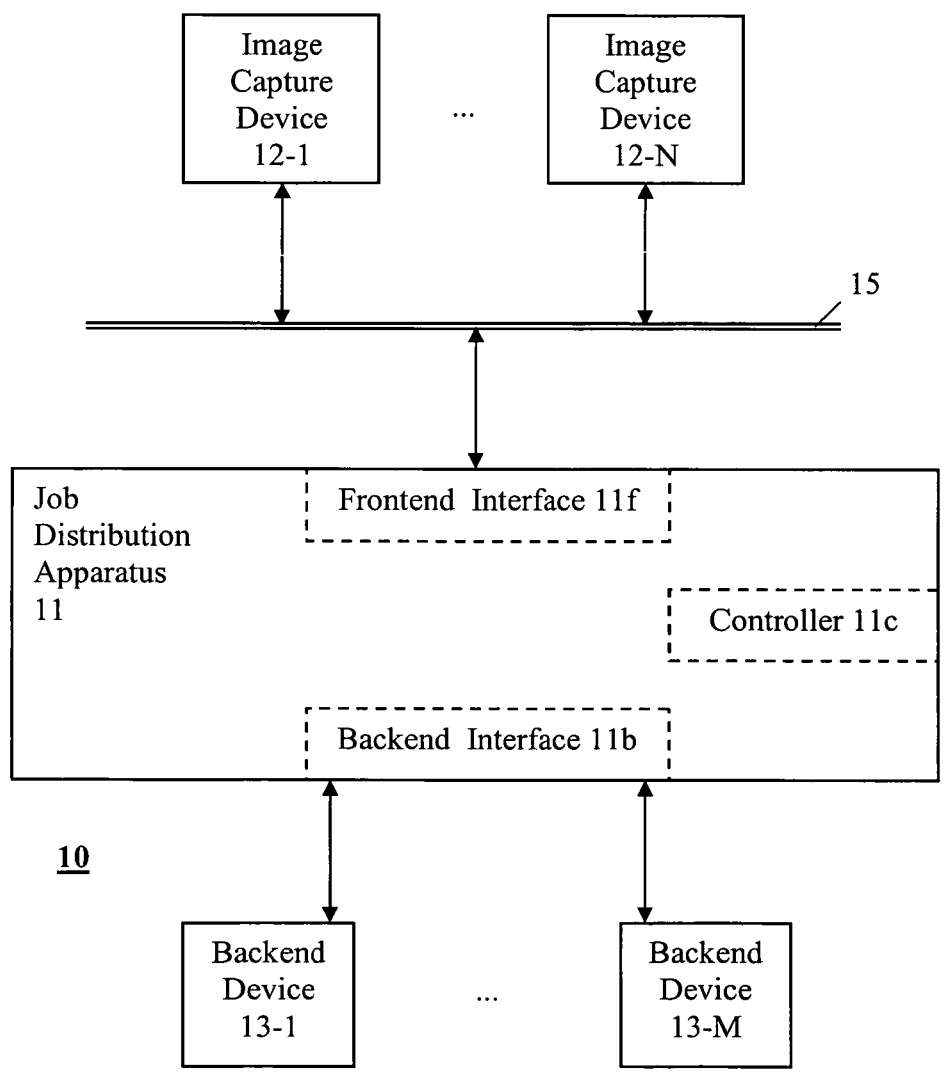
FIG. 1 shows a block diagram of a document processing system according to an example of the present disclosure.

In describing preferred embodiments illustrated in the drawings, specific terminology is employed for the sake of clarity. However, this disclosure is not intended to be limited to the specific terminology so selected and it is to be understood that each specific element includes all technical equivalents that operate in a similar manner.

Referring now to the drawings, wherein like reference numerals designate identical or corresponding parts throughout the several views, FIG. 1 shows a block diagram of a document processing system 10 according to an exemplary embodiment of the present disclosure. The system 10 includes a job distribution apparatus 11, (one or more) image capture devices 12-1 to 12-N, and backend devices 13-1 to 13-M.

A data communication network 15 connects one or more of the image capture devices 12-1 to 12-N to the job distribution apparatus 11. The network 15 can be a local area network, a wide area network or any type of network such as an intranet, an extranet, the Internet, or a combination thereof. Further, other communications links (such as a virtual private network, a wireless link, etc.) for the network 15 may be used as well. In addition, the network 15 preferably uses TCP/IP (Transmission Control Protocol/Internet Protocol), but other protocols can also be used. How devices can connect to and communicate over a data communication is well-known in the art and is discussed for example, in "How Networks Work", by Frank J. Derfler, Jr. and Les Freed (Que Corporation 2000), the entire content of which are incorporated by reference herein.

Each of the image capture devices 12-1 to 12-N can include a scanner, a copy machine, a printer, a fax machine, a digital camera, other office devices (such as a computer with an image capture function), and combinations thereof. In one example, an image capture device is a multi-function device (MFD) which can include scanning, copying, printing and faxing functions. The image capture device can have any or all of the functions of similar devices conventionally known, such as create web pages, send and receive e-mails with attachments, edit images, FTP files, surf the Internet, send a fax, etc.

The backend devices 13-1 to 13-M can include, for example, an e-mail server [for example, Lotus Notes™ e-mail server, Microsoft Exchange™ e-mail server, SMTP ("Simple Mail Transfer Protocol") e-mail servers, etc.], a fax server (for example, Captaris RightFax®, Omtool Fax Sr., Optus FACSys®, etc.), a document management system (for example, Application Xtender, Documentum, Domino.Doc, FileNET, Hummingbird, iManage, Interwoven, LiveLink, SharePoint, Stellent, etc.), a network directory or file storage system, a file format conversion system and an optical character recognition (OCR) system. The file format conversion system can be configured to convert a document from one format (for example, TIFF, "Tag Image File Format") to another (e.g., PDF, "Portable Document Format"). Examples of additional document management systems are disclosed in U.S. Patent Applications Publications Nos. 2004/0215671 A1 and 2005/0246272 A1, the entire contents of which are incorporated by reference herein.

The job distribution apparatus 11 includes the function of an intermediate agent or a gateway between the image capture devices and the backend devices. The job distribution apparatus can track and log the status (for example, normal, busy, jam, maintenance or service required, power off, error, etc.) of each image capture device in the system. For each image capture device, the job distribution apparatus registers an identification (such as host name, serial number, IP address, etc.) of the device.

In addition, the job distribution apparatus 11 tracks jobs which can include logging job name, job type, number of pages, date/time of job creation, date/time of last attempt, number of attempts, image capture device ID, project ID, user ID, backend device ID, etc. The job distribution apparatus monitors the status (for example, processing, failed, completed, etc.) of each of the jobs.

The job distribution apparatus 11 may include the features of the document manager and scan server of U.S. Patent Application Publication No. 2003/0217095 A1, U.S. Patent Application Publication No. 2003/0233437 A1, U.S. Patent Application Publication No. 2004/0024811 A1, U.S. patent application Ser. No. 11/092,831 filed Mar. 30, 2005 and entitled System And Method For Authenticating A User Of An Image Processing System, U.S. application Ser. No. 11/092,836 filed Mar. 30, 2005 and entitled System And Method For Managing Documents With Multiple Network Applications, and U.S. application Ser. No. 11/092,829 filed Mar. 30, 2005 and entitled System And Method For Compensating For Resource Unavailability In An Image Processing System, the entire contents of each of which are incorporated by reference herein.

The job distribution apparatus 11 is configured to enable bi-directional status and control between image capture devices (such as multi-functional peripheral (MFP) devices) on the one hand and backend devices on the other hand.

Figure 2A:
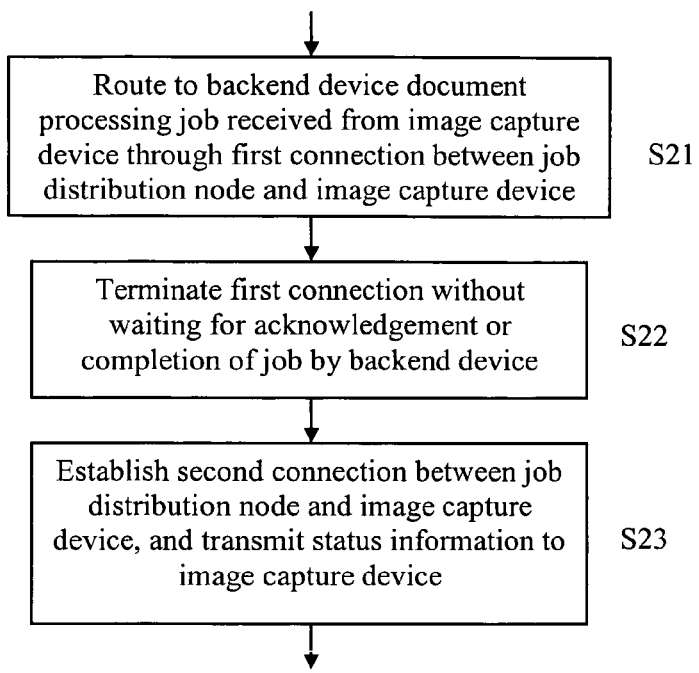
FIG. 2A shows a flow chart of a method for bi-directional status and control between image capture devices on the one hand and backend devices on the other hand, in accordance with one exemplary embodiment of this disclosure.

A method for bi-directional status and control between image capture devices on the one hand and backend devices on the other hand, is discussed below with reference to FIG. 2A. A document processing job received by a job distribution apparatus from an image capture device through a first connection between the image capture device and the job distribution apparatus via a data communication network is routed to a specified backend device (step S21). The first connection is allowed to terminate without waiting for acknowledgement or completion of the document processing job by the specified backend device (step S22). A second connection between the image capture device and the job distribution apparatus is established, and status information regarding performance of the document processing job by the specified backend device is transmitted from the job distribution apparatus through the second connection to the image capture device (step S23).

In the exemplary embodiment of FIG. 1, the job distribution apparatus 11 includes frontend interface 11f, backend interface 11b and job communication controller 11c. The frontend interface 11f is configured for communication with the image capture devices 12-1 to 12-N through the data communication network 15. The backend interface 11b is configured for communication with the backend devices 13-1 to 13-M. The job communication controller 11c controls the frontend interface 11f and the backend interface 11b for bi-directional status and control between the image capture devices on the one hand and backend devices on the other hand.

In one exemplary embodiment, the job communication controller controls the frontend interface to receive a document processing job from one of the image capture devices through a first connection between the image capture device and the job distribution apparatus through the data communication network, and controls the backend interface to route the document processing job to a specified backend device. The job communication controller allows the first connection to terminate without waiting for acknowledgement or completion of the document processing job by the specified backend device. Later, the job communication controller controls the frontend interface to transmit status information of the document processing job to the image capture device through a second connection between the image capture device and the job distribution apparatus.

For example, the image capture device may initiate the second connection, and the job distribution apparatus receives a status request from the image capture device through the frontend interface via the second connection initiated by the image capture device. The job communication controller controls the frontend interface to transmit the status information of the document processing job to the image capture device in response to the status request from the image capture device.

In another example, the job communication controller controls the frontend interface to establish the second connection with the image capture device after receiving the status information of the document processing job from the specified backend device. Alternatively, the job communication controller controls the frontend interface to establish the second connection with the image capture device and then transmit the status information of the document processing job a predetermined period of time after the document processing job is received from the image capture device.

The job communication controller may also control the frontend interface to send a notice of completion of the document processing job by the specified backend device, to the image capture device through an additional connection between the job distribution apparatus and the image capture device.

Figure 2B:
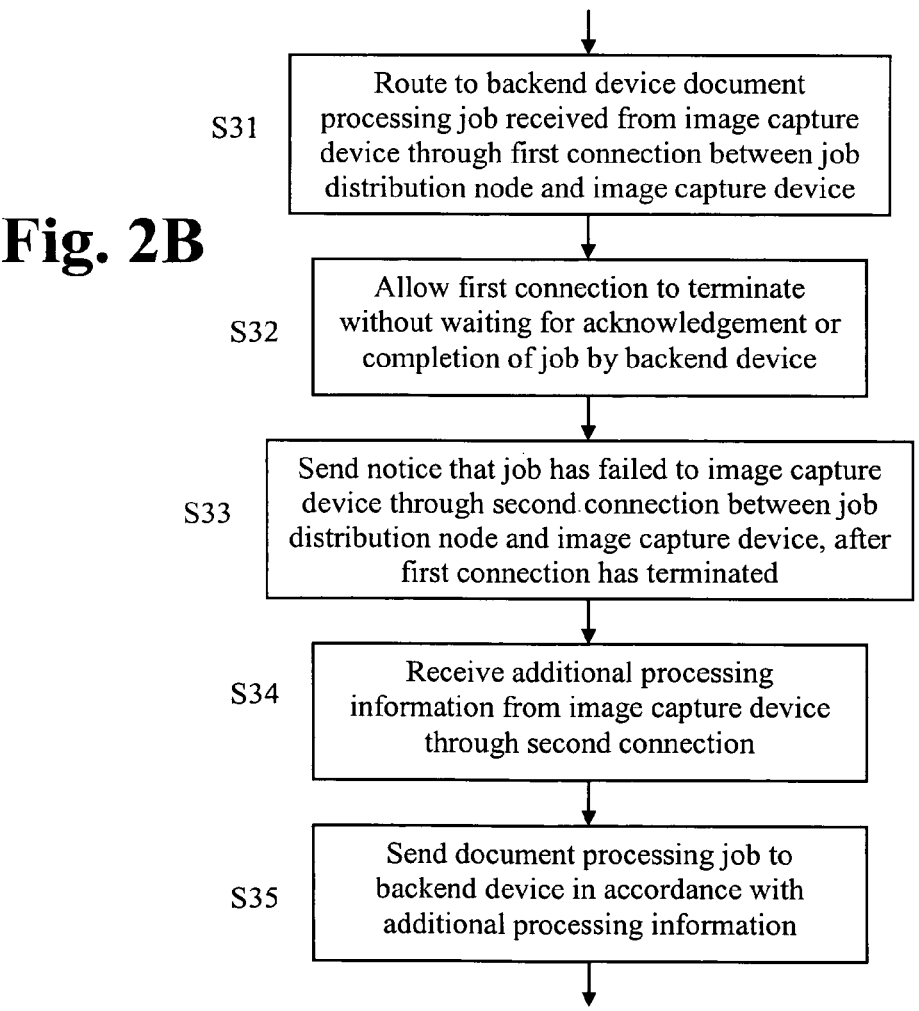
FIG. 2B shows a flow chart of a method for bi-directional status and control between image capture devices on the one hand and backend devices on the other hand, according to another embodiment.

FIG. 2B shows a flow chart for a method for bi-directional status and control, according to another exemplary embodiment. A document processing job including a first set of processing information received by the job distribution apparatus (or node) through a first connection between an image capture device and the job distribution apparatus via a data communication network is routed to a specified backend device (step S31). The first connection is allowed to terminate without waiting for acknowledgement or completion of the document processing job by the specified backend device (step S32). A notice that the document processing job has failed is sent from the job distribution apparatus to the image capture device through a second connection between the image capture device and the job distribution apparatus, after the first connection has been terminated (step S33). Additional processing information is received through the second connection from the image capture device (step S34). The document processing job is sent from the job distribution apparatus to the specified backend device a second time, in accordance with the additional processing information, without receiving the document processing job again from the image capture device (step S35). Thus, the Job can be resubmitted without requiring re-scan of the document at the image capture device.

For example, the job communication controller controls the frontend interface to receive a document processing job including a first set of processing information from an image capture device via a first connection between the image capture device and the job distribution apparatus through the data communication network, and controls the backend interface to route the document processing job to a specified backend device. The job communication controller allows the first connection to terminate without waiting for acknowledgement or completion of the document processing job by the specified backend device. Later, the job communication controller controls the frontend interface to transmit, after the first connection has been terminated, a notice that the document processing job has failed to the image capture device through a second connection between the image capture device and the job distribution apparatus. The job distribution apparatus receives additional processing information from the image capture device through the second connection, after the notice that the document processing job has failed is transmitted to the image capture device, and then controls the backend interface to send the document processing job to the specified backend device a second time, in accordance with the additional processing information, without receiving the document processing job a second time from the image capture device.

Additional information may be provided to the image capture device regarding the failed job. The job may have failed for any of various possible reasons. For example, user-entered processing information included with the job may be incorrect or unsupported (that is, cannot be handled) by the backend device. The processing information can include, for example, identification of the image capture device and/or target backend, a username and/or password, format of or index information for a document to be processed, etc. As another example, even if the user-entered information is valid at the time of entry, the user-entered information may be unsupported or otherwise invalid by the time the job is processed, since some time may elapse before the job is processed by the backend.

Further, there are instances in which only the backend can determine a job is invalid. For example, bar codes are often (but not always) applied to documents submitted to a document management system. The document management system scans the bar code which identifies the document. However, barcodes are sometimes not sufficiently clear to be scanned (such as when the document is the product of several generations of photocopying).

In addition, the job may fail because the communication channel did not allow proper communication of the job to the backend device. For example, a noisy channel may have allowed data corruption. As another example, the job may have been transmitted in multiple packets and one or more packets were never received. Further, the channel may have been overloaded and communication of the job could not be completed.

The job distribution apparatus may optionally further comprise job validation means for detecting that at least a portion of the first set of processing information is invalid. As another example, the job communication controller controls the backend interface to receive a message that the document processing job is invalid from the specified backend device. In either instance, the notice transmitted to the image capture device further includes an indication that the document processing job has failed because at least a portion of the first set of processing information is invalid.

The document processing job typically includes a document to be processed, and the first set of processing information includes instructions for processing the document. The instructions included with the original job may have been unacceptable for any of various reasons. The notice sent to the image capture device may indicate that the submitted job failed because the instructions were unacceptable, with or without additional details.

In another example, the first set of processing information may include index information (for example, attached as meta data) for the document. In such circumstances, the notice transmitted to the image capture device may include an indication that the document processing job has failed because the index information for the document is invalid. In addition, the job distribution apparatus may request further instructions from the image capture device. In response thereto, the additional processing information received from the image capture device may include, for example, replacement information for the index information that is invalid.

In any event, the job communication controller preferably controls the frontend interface to transmit to the image capture device, after it is determined that the document processing job has failed, further processing options for processing the document processing job. In such an instance, the additional processing information received by the job distribution apparatus from the image capture device may correspond to one or more selected options. The further processing options can include as a selectable option an instruction to the job distribution apparatus to retransmit the document processing job as is to the specified backend device again, without retransmitting the document processing job from the image capture device to the job distribution apparatus a second time. Another selectable option may be an instruction to override the first set of processing information with the additional processing information, and retransmit the document processing job from the job distribution apparatus to the specified backend device a second time, without retransmitting the document processing job from the image capture device to the job distribution apparatus again. The further processing options also may include an instruction to cancel the document processing job.

The job distribution apparatus may be a special-purpose device (such as including one or more application specific integrated circuits or an appropriate network of conventional component circuits, as would be readily apparent to those skilled in the art) or it may be software-implemented on a conventional personal computer or computer workstation with sufficient memory and processing capabilities, as will be appreciated to those skilled in the relevant arts.

Figure 3:
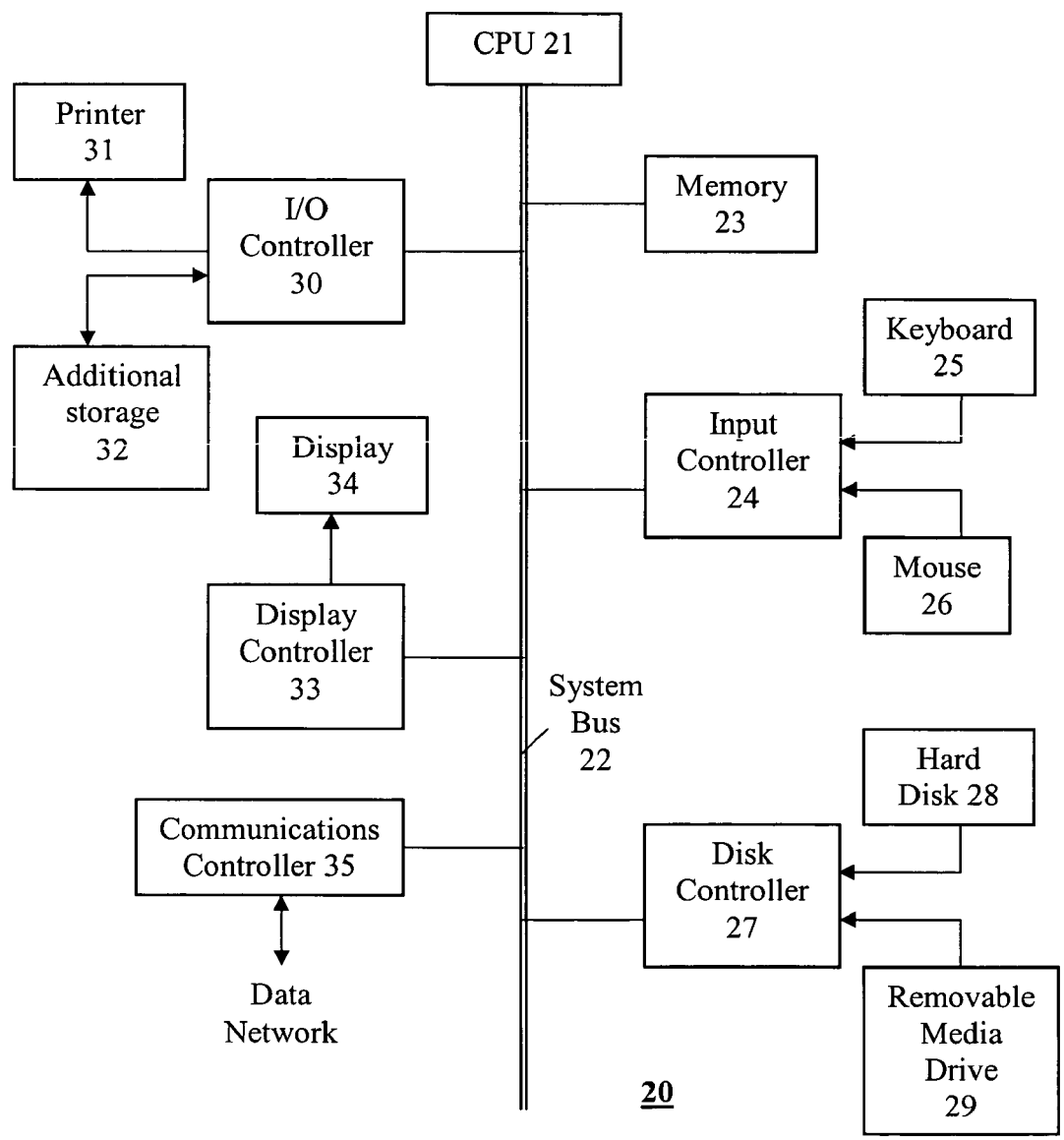
FIG. 3 shows a block diagram of a computer which can be software-adapted to implement a job distribution apparatus according to an example of the present disclosure.

An example of such a computer is shown schematically in FIG. 3. Computer 20 includes a central processing unit (CPU) 21 that communicates with a number of other devices by way of a system bus 22. Memory 23 that hosts temporary storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.]. A communication controller 35 provides a connection (for example, by way of an Ethernet connection or other network connection which supports any desired network protocol such as, but not limited to TCP/IP, IPX, IPX/SPX, or NetBEUI) to a data communication network.

The central processing unit 21 is configured for performing a significant number of mathematical calculations. A Pentium III microprocessor such as the 1 GHz Pentium III manufactured by Intel Inc. may be used for the CPU 21. This processor employs a 32 bit architecture. Other suitable processors include the Motorola 500 MHZ PowerPC G4 processor and the Advanced Micro Devices 1 GHz AMD Athlon processor. Multiple processors or workstations may be used as well.

Additional components of the computer 20 are conventional and well-known, and in the interest of clarity are not discussed in detail herein. Such components are discussed, for example, in "How Computers Work", by Ron White (Que Corporation 1999), the entire content of which are incorporated by reference herein.

The mechanisms and processes of this specification may be embodied in a computer-based product that may be stored on a storage medium and include instructions that can be used to program a computer to perform a process in accordance with this specification. This storage medium can include, but is not limited to, any type of disk including floppy diskettes, optical disks, magneto-optical disks, ROMs, RAMs, EPROMs, EEPROMs, FLASH memory, or any type of media suitable for storing electronic instructions.

Figure 4A:
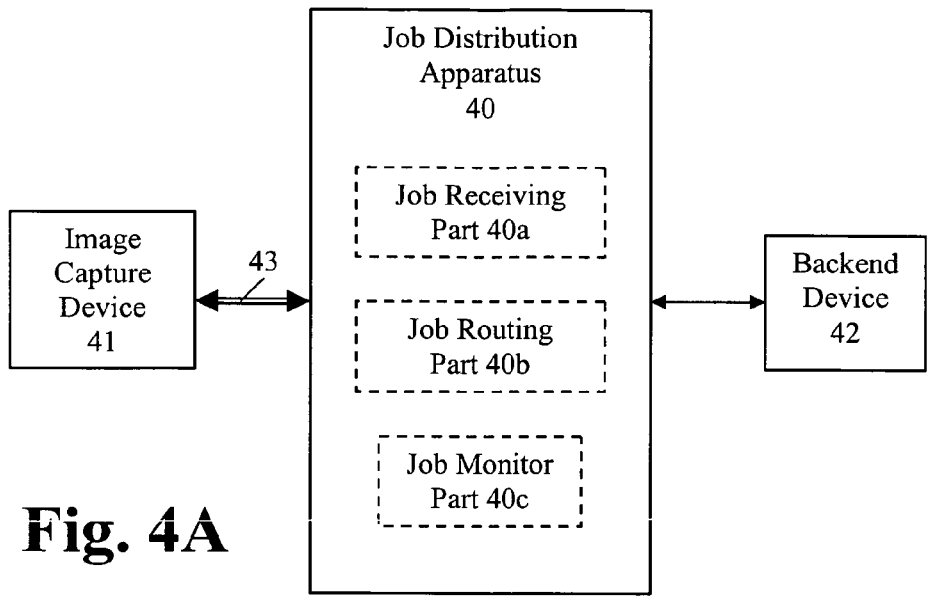
FIG. 4A shows a schematic diagram of a software-implemented job distribution apparatus according to an example of the present disclosure.
Figure 4B:
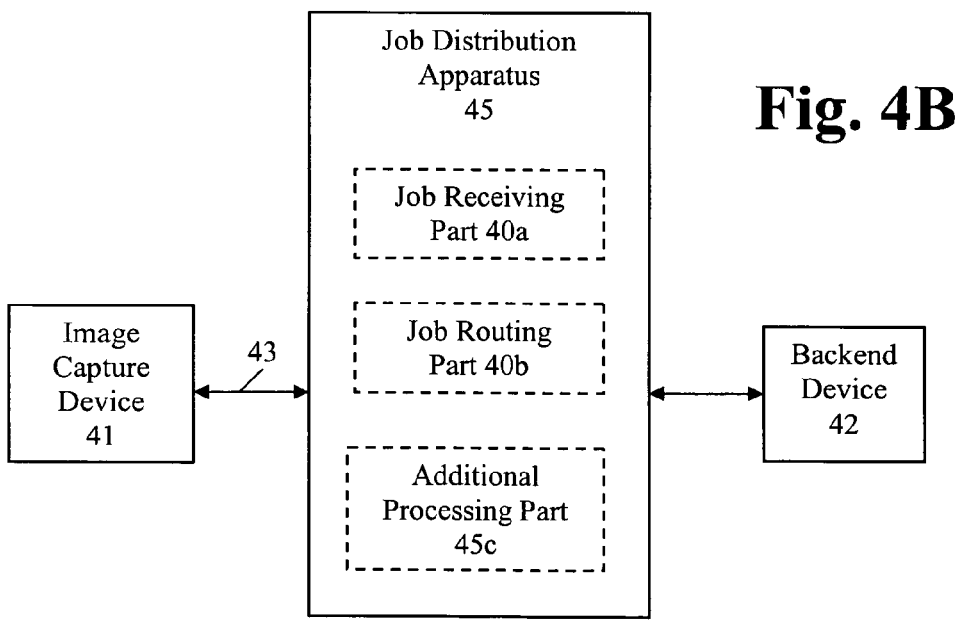
FIG. 4B shows a schematic diagram of a software-implemented job distribution apparatus according to another example of the present disclosure.

Referring to FIGS. 4A and 4B, a job distribution apparatus which can be software-implemented, according to two exemplary embodiments, is discussed below.

Job distribution apparatus 40 comprises a job receiving part 40a and a job routing part 40b. The job receiving part 40a is configured to receive a document processing job from an image capture device 41 through a first connection between the image capture device 41 and the job distribution apparatus 40 through a data communication network 43. Thereafter, the job distribution apparatus 40 allows the first connection to terminate without waiting for acknowledgement or completion of the document processing job by the specified backend device 42, and the job routing part 40b routes the document processing job to a specified backend device 42.

In one example (FIG. 4A), a job monitor part 40c is provided in addition to the job receiving part 40a and the job routing part 40b. The job monitor part 40c monitors a status of processing of the document processing job by the backend device, and transmits status information of the document processing job to the image capture device 41 through a second connection between the image capture device 41 and the job distribution apparatus 40, after the first connection has terminated.

The job distribution apparatus may further include a status request receiving part (not shown) configured to receive a status request from the image capture device 41 through the second connection. In this instance, the second connection may be initiated by the image capture device 41. The job monitor part 40c transmits the status information of the document processing job to the image capture device 41 in response to the status request from the image capture device.

On the other hand, the job monitor part 40c may establish the second connection after receiving the status information of the document processing job from the specified backend device 42. In another example, the job monitor part 40c may establish the second connection and transmit the status information of the document processing job, a predetermined period of time after the document processing job is received from the image capture device.

The job monitor part 40c may send to the image capture 41 device through an additional connection between the job distribution apparatus 40 and the image capture device 41, a notice of completion of the document processing job by the specified backend device, and may send the notice along with an instruction to the image capture device to print out the notice. The notice may be provided through an e-mail, a facsimile or a message displayed on a display of the image capture device.

In another exemplary embodiment (FIG. 4B), the document processing job includes a set of processing information from the image capture device, and a job distribution apparatus 45 includes an additional processing part 45c in addition to a job receiving part 40a and a job routing part 40b. The additional processing part 45c is configured to transmit a notice that the document processing job has failed to the image capture device 41 through a second connection between the image capture device 41 and the job distribution apparatus 45, after the first connection has been terminated. Thereafter, the additional processing part 45c receives additional processing information from the image capture device 41 after the notice has been transmitted, and sends the document processing job to the specified backend device 42 a second time in accordance with the additional processing information, without receiving the document processing job a second time from the image capture device 41.

Additional optional functions and capabilities of the job distribution apparatus are discussed below.

For example, a job monitor part may be provided to detect that the first set of processing information is invalid. Further, the job monitor part may receive from the specified backend device 42 a message that the document processing job is invalid.

In another example, an optional job storage part (not shown) may be provided to store the document processing job. After it is determined that the document processing job has failed, the stored document processing job is retrieved from the job storage part, and the document processing job is resubmitted by the job routing part to the specified backend device, in accordance with the additional processing information, without the job distribution apparatus receiving the document processing job from the image capture device the second time.

Figure 5:
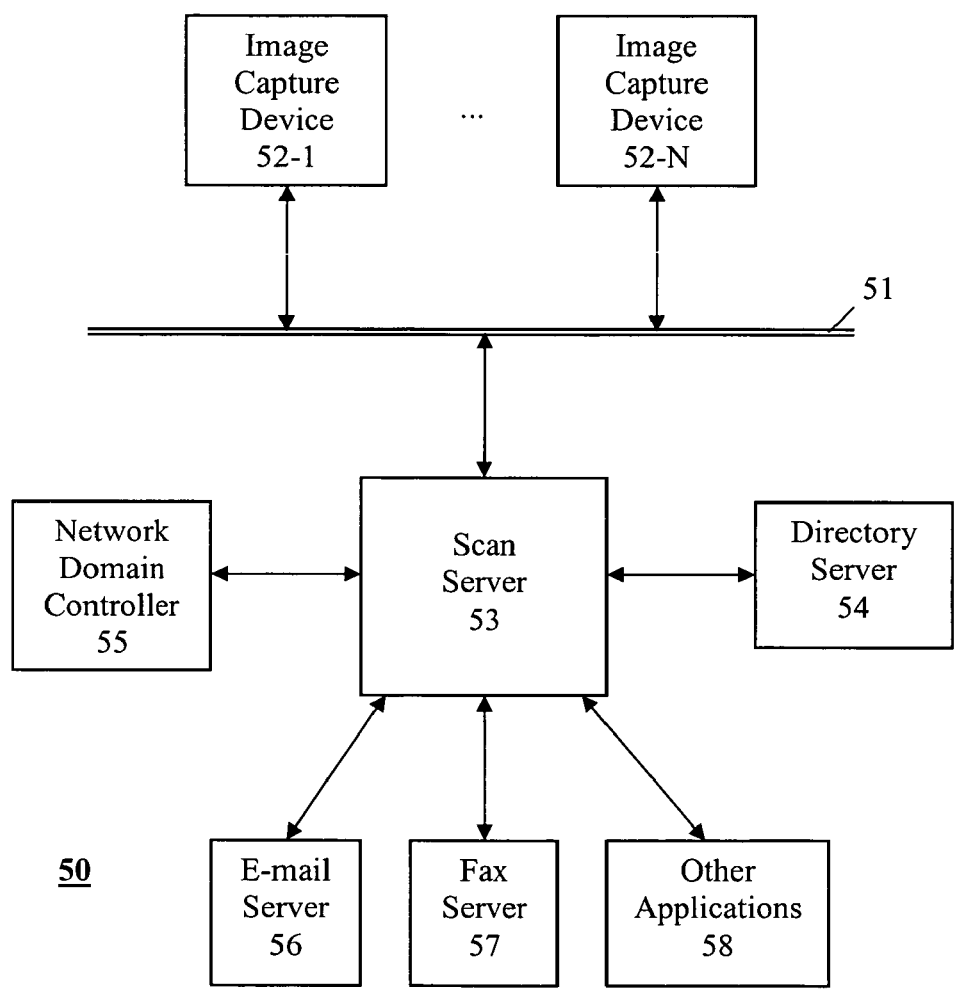
FIG. 5 illustrates an example of a system for scanning and managing documents.

An example of a system for scanning and managing documents which allows a user to scan a document and to e-mail and/or fax the scanned document from an image capture device is shown in FIG. 5. System 50 includes a network 51 that interconnects at least one, but preferably a plurality of image capture devices (for example, MFDs) 52-1 through 52-N, to a scan server 53.

The scan server 53 is connected to a directory server 54 (or "address book server" or "global directory"). The directory server 54 can include information such as the names, addresses, e-mail addresses, phone/fax numbers, other types of destination information, and authorization of individuals. Other information can be included in the directory server 54. Examples of directory servers 54 include, but are not limited to, Lotus Notes™, Microsoft Exchange™, and LDAP ("Lightweight Directory Access Protocol") enabled directory servers. LDAP is a software protocol that enables a user to locate organizations, individuals, files, devices in a network.

The system 50 provides access to the users of the image capture devices 52-1 through 52-N of the information stored at the directory server 54 via the scan server 53. Accordingly, a user can scan a document at the image capture device 52-1, and request a search of the company's global directory stored at the directory server 54. The scan server 53 can pass the search request to the directory server 54 and can receive the search results (e.g., e-mail addresses and/or fax numbers) from the directory server 54. The scan server 53 can pass the search results to the image capture device 52-1, which can temporarily store and display them. The stored search results are preferably erased automatically from the image capture devices after the job of the image capture devices is completed, or after a time period (for example, two minutes) that can be set by the administrator of the system. The user can select e-mail addresses and fax numbers from the displayed search results and request that the scanned document be e-mailed and/or faxed to the selected addresses. Alternatively, the user can enter the addresses and numbers, or can select addresses and numbers from a local directory stored in the image capture devices 52-1 through 52-N. The local directory can be updated automatically or periodically after the directory server 54 is updated.

The scan server 53 receives the scanned document and the selected addresses/numbers from the image capture device 52-1 and routes the scanned document to the appropriate server. For example, if the user requests the scanned document to be e-mailed, the scan server 53 routes the scanned document to an e-mail server 56. E-mail server 56 can include, but is not limited to, Lotus Notes™ e-mail server, Microsoft Exchange e-mail server, and SMTP ("Simple Mail Transfer Protocol") e-mail servers. If the user requests the scanned document to be faxed, the scan server 53 routes the scanned document to a fax server 57. The fax server 57 may be, for example, the Captaris RightFax® server. The scan server 53 can also route the scanned document to other applications 58, which may, for example, convert a document from one format (e.g., TIFF, "Tag Image File Format") to another (PDF, "Portable Document Format").

The scan server 53 can be configured to act as an intermediate agent between a plurality of computerized services (for example, provided by devices 54-58) so that the image capture devices can perform a plurality of functions in a same scanning job. The Scan Server 53 can be configured to display the plurality of services based on a request from a browser on the image capture device. The image capture device can display screens prompting the entry of a plurality of parameters such as e-mail addresses, fax numbers and billing codes, on a display (for example, LCD) panel based on the communication between the image capture device and the Scan Server 53. The image capture device can then transmit the scanned document to a plurality of servers, for example, servers 56-58.

The image capture devices 52-1 through 52-N and the scan server 53 preferably exchange data using the protocol HTTP ("Hypertext Transfer Protocol") or HTTPS (HTTP over Secure Socket Layer) over the network 51. It should be apparent, however, that other protocols can equivalently be used. Preferably, the image capture devices 52-1 through 52-N and the scan server 53 exchange data using XML ("Extensible Markup Language") format. However, other formats, such as HTML, can equivalently be used.

The scan server 53 can also be connected to a network domain controller 55 that controls authentication of users of the image capture device. The system 50 provides three levels of user authentication. At a first authentication level, no user authentication is performed. Under this first level, any user can use the image capture devices 52-1 through 52-N to scan, copy, print, access the global directory server 54 to e-mail and fax documents.

At the second authentication level, the user is domain authenticated by the network domain controller 55. Under this second level, the user enters login information, such as a login name and a password. This login information is transmitted to the scan server 53 via the network 51. The scan server 53 passes the login information to the network domain controller that confirms (or not) the user's domain authentication. The confirmation is passed to the image capture devices 52-1 through 52-N via the scan server 53. If the user is domain authenticated, the user can use the image capture device and its functions. For example, the system 50 can be configured so that certain functions of the image capture devices 52-1 through 52-N, such as copying and direct e-mail and faxing (without access to the global directory server 54), be accessible to a user who is not domain authenticated. In this example, however, the system bars the non-authenticated user from using other functions, including access to the global directory server 54. In another example, the system bars the non-authenticated user from using all functions provided by the image capture devices 52-1 through 52-N.

At the third authentication level, the user is authenticated by the directory server 54. Under this third level, the directory server 54 can control what portions (if any) of the directory, to which the user can have access. For example, employees of a particular division of the company (e.g., human resources, legal, etc . . . ) may have access to the portion of the directory that corresponds to that division only. More sensitive information can thus be protected and accessible only by certain individuals within the company. This third authentication level can be, but need not be, in addition to the second level.

Under the second and third authentication levels, the system can create a user profile such that upon authentication, the system provides access to the user only for certain functions that correspond to the user profile. In this example, different authenticated users can have different user profiles and thus have access to different functions. The administrator can control the user profiles.

The scan server 53 can include a profiler that sets a specific profile for a specific image capture device. The administrator of the system 50 can create, change and maintain profiles via a profile screen on the scan server 53. The profile can include an identification for the image capture device, such as a serial number, and various parameters (computer network-name, machine location, etc . . . ) used to configure the exchange of information between the scan server 53 and the image capture devices 52-1 through 52-N. These parameters can relate to the authentication scheme used for each image capture device, to the data format/protocols used, to the e-mail server 56, to the fax server 57, and/or to the directory server 54. The profile can also include the time period during which the search results from the directory server are stored at the scanning device before being erased.

Examples of additional functionalities for network domain control, user authentication and global directory access are disclosed in U.S. Patent Applications Publications Nos. 2003/0217095 A1, 2003/0233437 A1 and 2004/0024811 A1, the entire contents of each of which are incorporated by reference herein.

Figure 6:
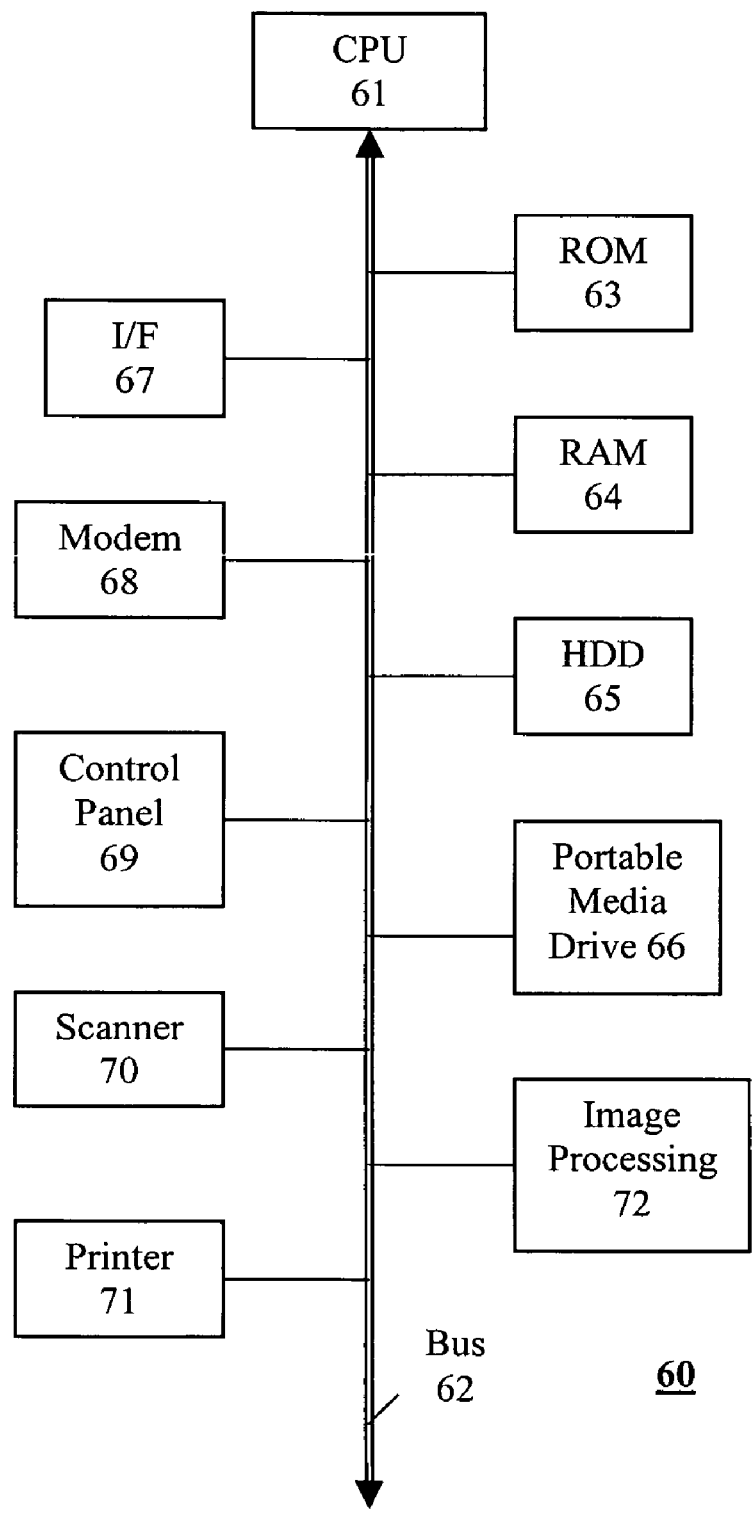
FIG. 6 illustrates an example of an image capture device.
Figure 7A:
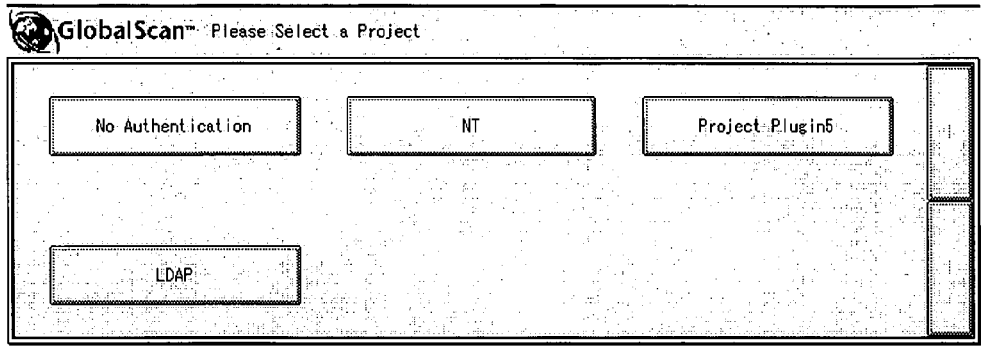
FIGS. 7(a) through 7(y) illustrate some exemplary user interface screens which can be displayed on the image capture device of FIG. 6.
Figure 7B:
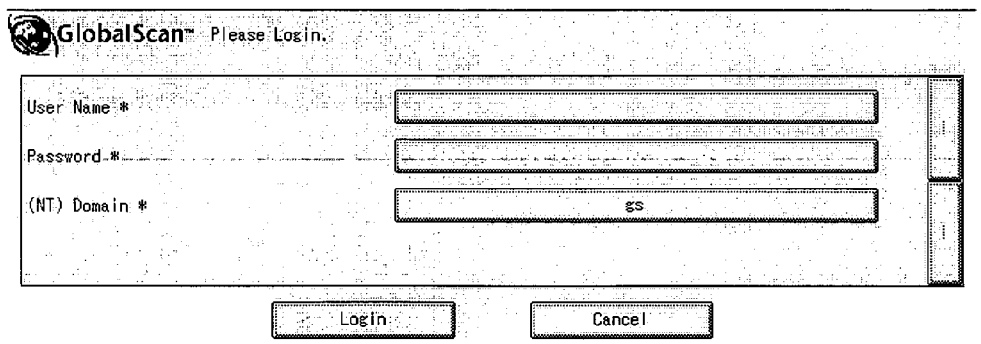
Figure 7C:
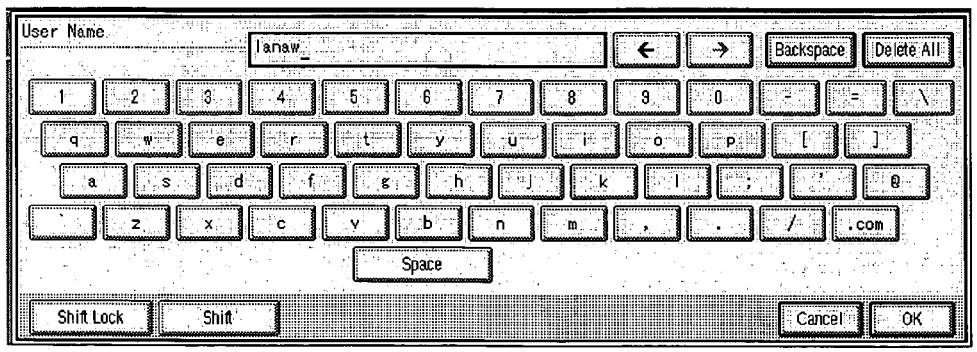
Figure 7D:
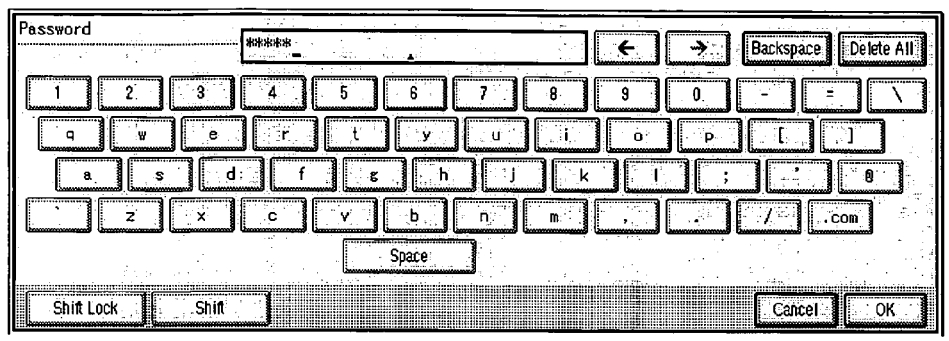
Figure 7E:
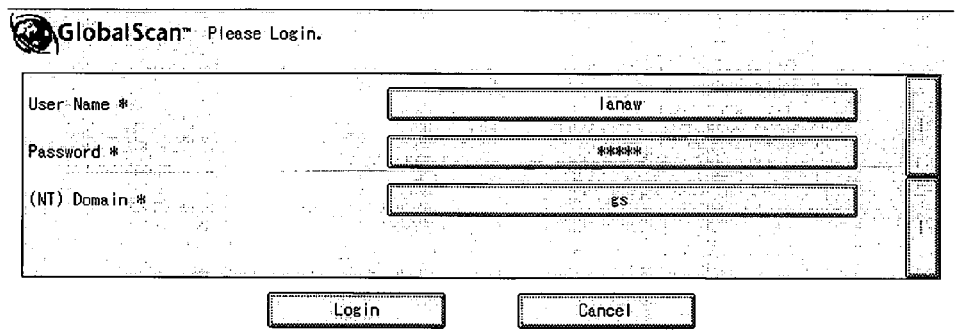
Figure 7F:
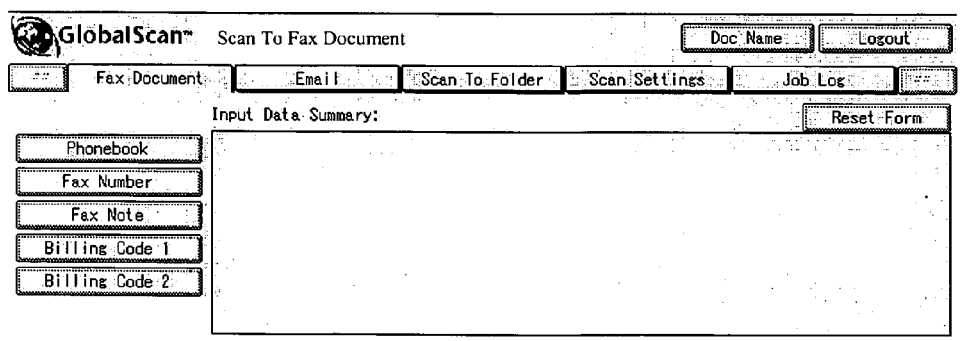
Figure 7J:
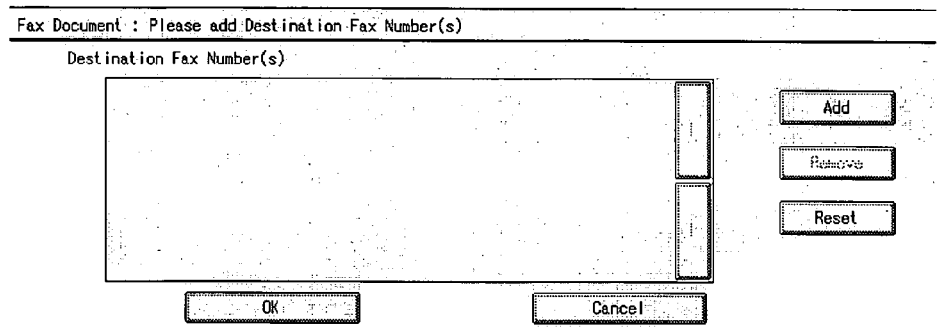
Figure 7K:
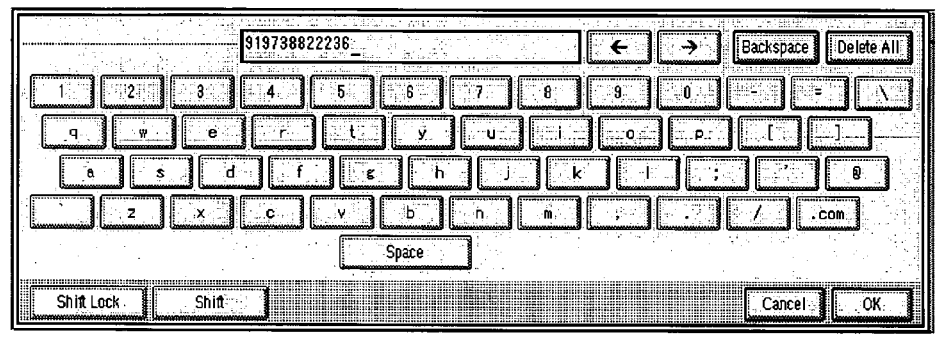
Figure 7L:
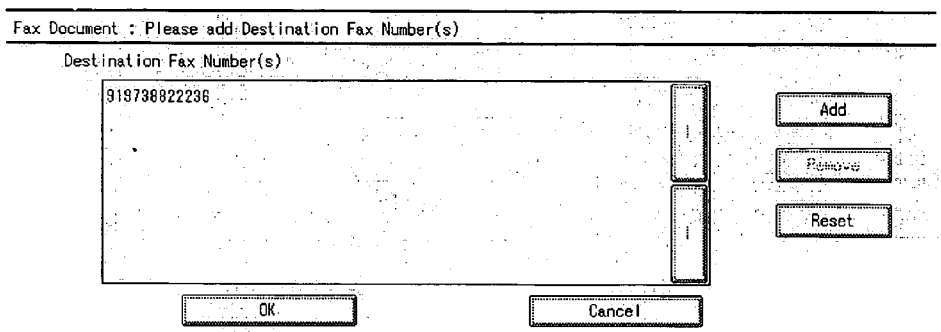
Figure 7M:
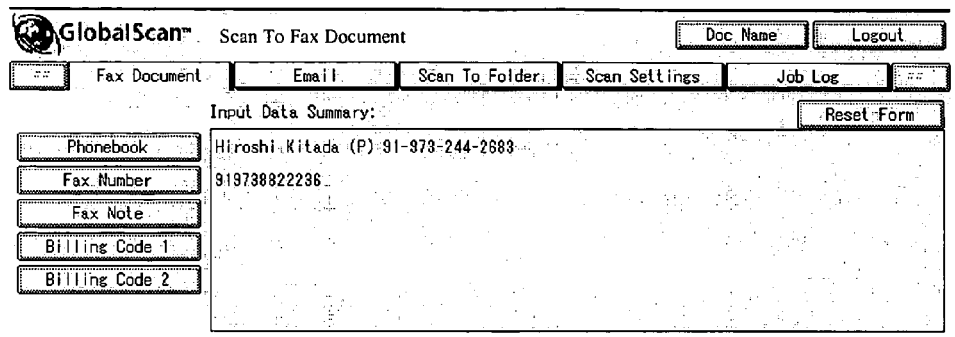
Figure 7N:
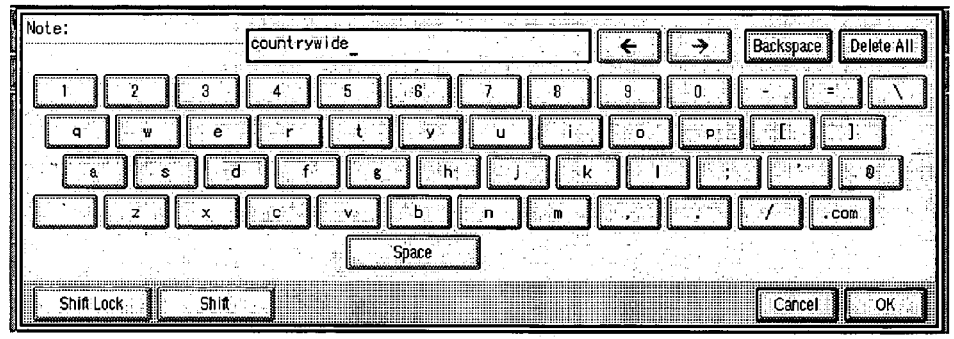
Figure 7P:
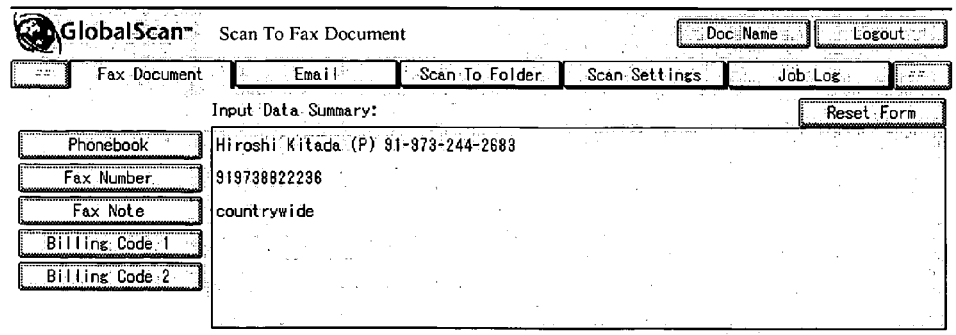
Figure 7Q:
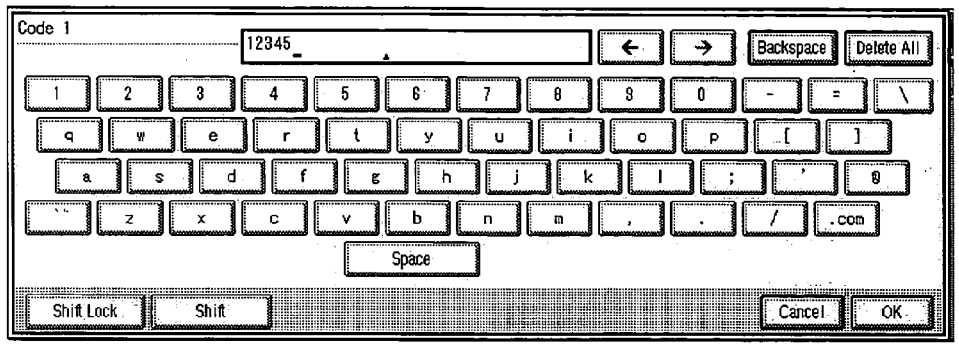
Figure 7R:
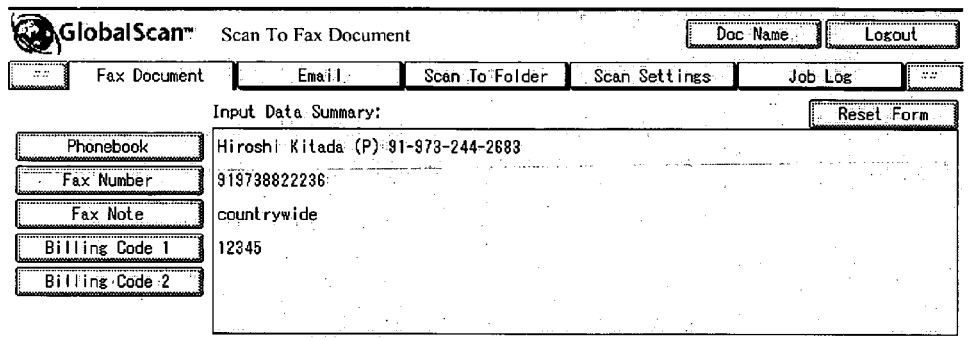
Figure 7S:
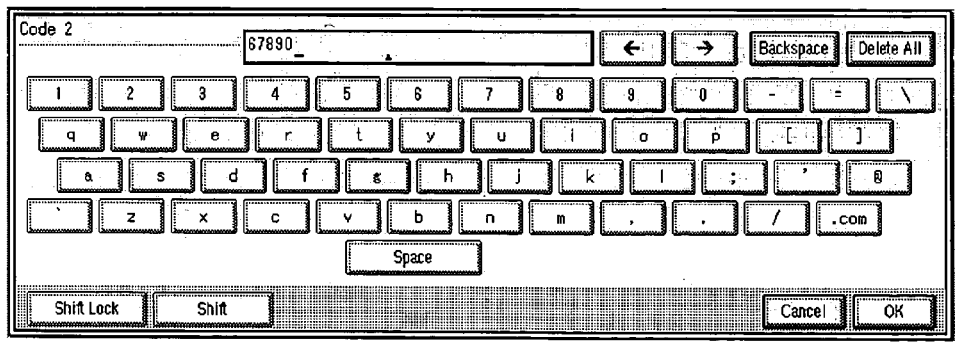
Figure 7T:
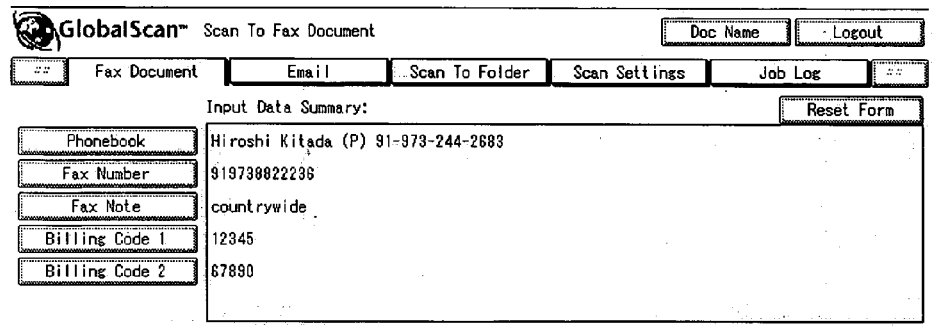
Figure 7U:
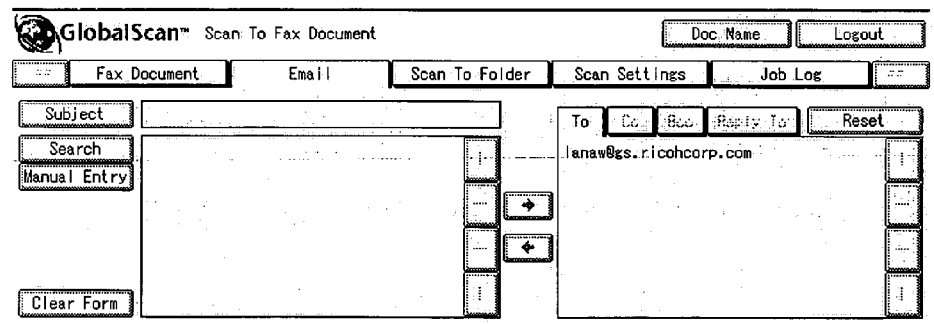
Figure 7V:
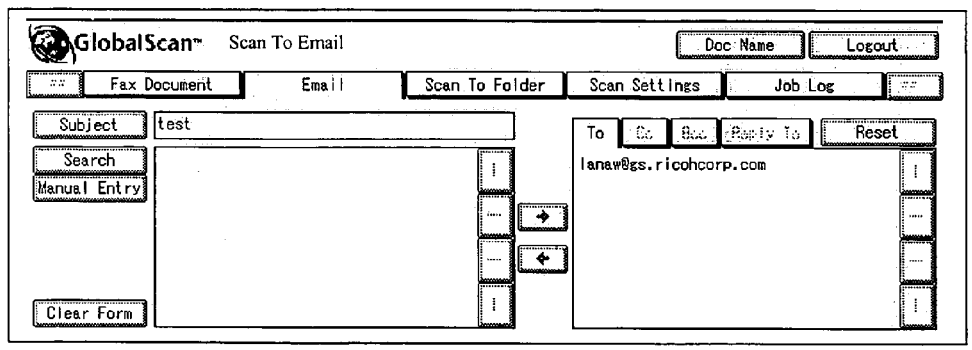

FIG. 6 illustrates an example of an image capture device. Image capture device 60 includes a central processing unit (CPU) 61, and various elements connected to the CPU 61 by an internal bus 62. The CPU 61 services multiple tasks while monitoring the state of the image capture device 60. The elements connected to the CPU 61 include a read only memory (for example, ROM, PROM, EPROM, EEPROM, etc.) 63, a random access memory (RAM) 64, a hard disk drive (HDD) 65, portable media (for example, floppy disk, optical disc, magnetic discs, magneto-optical discs, semiconductor memory cards, etc.) drives 66, a communication interface (I/F) 67, a modem unit 68, a control panel 69, a scanner unit 70, a printer unit 71, and an image processing device 72.

Program code instructions for the image capture device 60 can be stored on the ROM 63, on the HDD 65, or on the portable media and read by the portable media drive 66, transferred to the RAM 64 and executed by the CPU 61 to carry out the instructions. These instructions can be the instructions to perform the image capture device's functions described above and permit the image capture device 60 to interact with the scan server 53 and to control the control panel 69 and the image processing unit 72 of the image capture device 60.

The control panel 69 includes a display screen that displays information allowing the user of the image capture device 60 to interact with the scan server 53. The display screen can be a liquid crystal display (LCD), a plasma display device, or a cathode ray tube (CRT) display. The display screen does not have to be integral with, or embedded in, the control panel 69, but may simply be coupled to the control panel 69 by either a wire or a wireless connection. The control panel 69 may include keys for inputting information or requesting various operations. Alternatively, the control panel 69 and the display screen may be operated by a keyboard, a mouse, a remote control, touching the display screen, voice recognition, or eye-movement tracking, or a combination thereof.

An image capture device is preferably equipped with a touch sensitive display (for example, LCD), and can be configured to provide interactive menus based on information input by an operator of the image capture device, so as to allow the operator to conveniently take advantage of the services provided by the system.

Some exemplary user interface screens are discussed below in connection with FIG. 7(*a*) through FIG. 7(*y*).

The user may initially be prompted to select a project in order to access services from the image capture device [FIG. 7(*a*)]. A number of projects may be available for selection. Projects provide multiple ways of configuring (or customizing) services based on the specific needs of corresponding groups of users. For example, in an enterprise, members of the sales department may have the specific need regularly to e-mail lengthy proposals to prospective customers, and members of the legal department may have the specific need regularly to scan hardcopy correspondence directly to a document management application. Each user can simply choose the appropriate project using the project selection screen.

For some projects, the user may need to be authenticated (such as enter login credentials). For example, when the user presses the "NT" button in the screen of FIG. 7(*a*), the login screen shown in FIG. 7(*b*) is displayed prompting the user to enter login information (for example, user name, password, domain, etc.). When the user moves the cursor to enter, for example, user name, a can enter user name information by operating the soft keyboard [FIG. 7(*c*)]. After the user pushes the OK button, the user name information is registered, and the login screen is displayed again, with the user name field updated with the entered user name information. When the user moves the cursor to enter the password, the soft keyboard is displayed for entry of the password [FIG. 7(*d*)]. After the user enters the password and pushes the OK button, the password entered by the user is registered, and the login screen is displayed once again [FIG. 7(*d*)], with the password field updated (but masked for security purposes). In the example of FIG. 7(*b*) and FIG. 7(*e*), the domain by default is "gs". However, the user can move the cursor to the domain field to change the domain name. In any event, when the user presses the login button, the registered login information is processed and an authentication process is performed.

FIG. 7(*b*) through FIG. 7(*e*) are an example of NT authentication. It should be understood that other authentication processes (such as Novell, LDAP, etc.) can be provided.

Following log-in (if authentication is required), the user can be presented with select services window in which a list of available services (for example, e-mail, scan-to-folder, fax document, etc.), such as in the form of corresponding tabs, is displayed. The user selects a service by touching the corresponding tab.

For example, when the user touches the Fax Document tab, a Scan To Fax Document screen such as shown in FIG. 7(*f*) can be presented. When the user presses the Phonebook button, a screen such as shown in FIG. 7(*g*) can be displayed to allow the user to search for one or more telephone numbers. After the user chooses a number from the list on the left side of the screen by touching the corresponding entry in the list, followed by pressing the right arrow (→) button, the number is added to the right side of the screen [FIG. 7(*h*)]. When the selection of number(s) is complete, the user can press the OK button, and then the selected numbers are registered and displayed in the Input Data Summary of the Fax Document window [FIG. 7(*i*)]. The user can add additional information. For example, when the user presses the Fax Number button, a screen such as shown in FIG. 7(*j*) can be displayed to allow the user to specify a destination fax number. When the user presses the Add button, the soft keyboard is presented for the user to specify a destination fax number [FIG. 7(*k*)]. After the user presses the OK button on the soft keyboard, the entered number is registered and shown in the Destination Fax Number(s) window [FIG. 7(*l*)]. When the selection of destination fax number(s) is complete, the user can press the OK button, and then the selected numbers are registered and displayed in the Input Data Summary of the Scan To Fax Document window [FIG. 7(*m*)]. The user can press the Fax Note button and then enter comments via the soft keyboard that is displayed [FIG. 7(*n*)], to add a note regarding the Fax Document job [FIG. 7(*p*)]. Similarly, the user can add billing code information [FIG. 7(*q*) through FIG. 7(*t*)].

Another service which can be selected by the user is Scan-to-Email. When the user presses the Email tab, a Scan To Email screen such as shown in FIG. 7(*u*) can be displayed. The user can search, in an address book (for example, a Global Address Book of a LDAP Directory Server), for an e-mail address or manually insert the address (via a soft keyboard), as a destination (or Cc or Bcc or Reply To) address. In addition, the user can enter Subject information (via a soft keyboard) [FIG. 7(*v*)].

The user can also select the Scan-To-Folder service. When the user presses the Scan To Folder tab, a Scan To Folder screen such as shown in FIG. 7(*w*) can be displayed. A list of folders that the user is authorized to access is displayed for selection by the user. The folders can include, for example, folders in the user's home directory, public folders, etc. The user can scroll through the list to find an appropriate folder.

The user can choose to set scan parameters. When the user presses the Scan Settings tab, a Scan Settings screen such as shown in FIG. 7(*x*) can be displayed. The user can set the resolution of the scan, specify the configuration and orientation of the original, indicate the output file format (for example, TIFF, JPEG, PDF, PDF IMage Text, PDF Text, RTF, Excel, etc.), indicate scan type (for example, batch scan, color scan, etc.), OCR language, and so on.

The user can also select the Job Log service. When the user presses the Job Log tab, a Job Log screen such as shown in FIG. 7(*y*) can be displayed. The log shows a list of pending jobs, including for each job, the sender, date and time the job was sent, document name, number of pages, and status. The user can scroll through the list to find a job of interest. The Job Log window can be configured to display all pending jobs or selected jobs (for example, only pending jobs submitted by the user or anyone in the user's group). In addition, the Job Log window can be configured to allow the user to access any job identified in the list to which the user has access rights.

In addition, at any time after login, the user can access other documents that the user has authorization to access, by pressing the Doc Name button in the select services window. Thereafter, the user is prompted for a document name. After the document name is entered (via the soft keyboard), the user's login information is compared to access rights information for the document identified by the entered document name. If authorization is verified, document information for the document is retrieved and the select services window is displayed.

Additional examples of menus which can be displayed on a touch sensitive display of an image capture device as well as other functionalities of the image capture device are disclosed in U.S. Patent Applications Publications Nos. 2003/0217095 A1, 2003/0233437 A1 and 2004/0024811 A1, the entire contents of each of which are incorporated by reference herein.

Figure 8:
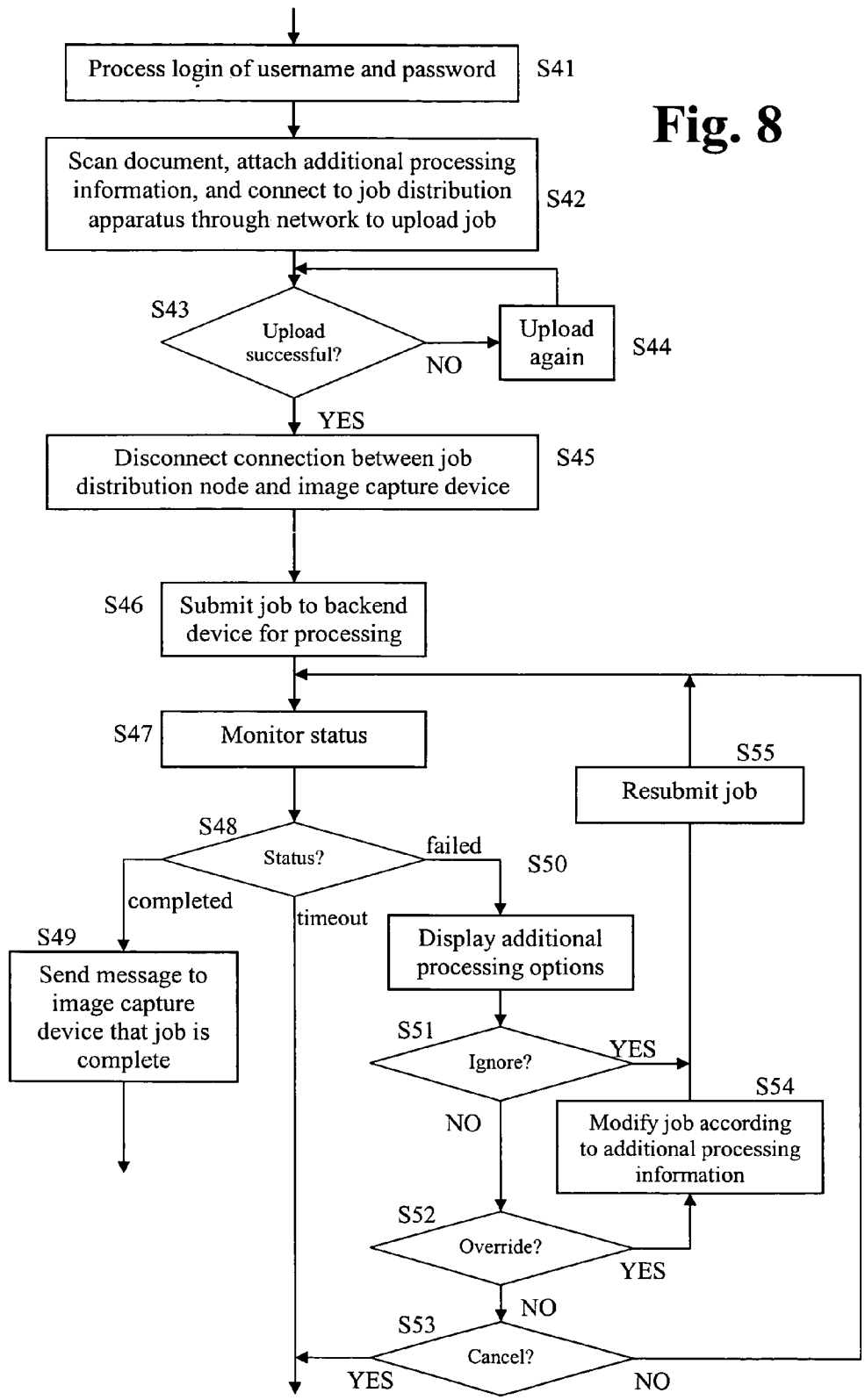
FIG. 8 shows a flow chart for an example of a method for processing a document processing job.

An example of a method for processing a document processing job in which index information, username and identification of the image capture device are included with the document to be processed is discussed below with reference to FIG. 8.

The process is commenced by a user supplying a username and password at the image capture device (step S41). A document is scanned, processing information is attached to the scanned document to form a document processing job, and a connection to the job distribution apparatus is initiated through the network to upload the job (step S42). If the upload is not successful (step S43, NO), upload is attempted again (step S44). If the upload is successful (step S43, YES), the connection between the image capture device and the job distribution apparatus is disconnected (step S45). The document processing job is submitted to the backend device for processing (step S46). The job distribution apparatus monitors the status of the processing of the document processing job by the backend device. If the job is completed (step S48, completed), a message is sent to the image capture device that the job is complete (step S49). If the waiting has a time limit (step S48, timeout), the process times out and terminates. If the job has failed (step S48, failed), additional processing options (for example, ignore, override or cancel), are provided to the image capture device for selection (step S50). If the user selects ignore (step S51, YES), the job is resubmitted to the backend device with no modification (step S55). If the user selects override (step S52, YES), the user is provided with an opportunity to submit additional processing information and the job is modified according to the additional processing information (step S54), and the job as modified is submitted to the backend device for processing (step S55). If the user selects cancel (step S53, YES), the job is discarded and the process is terminated. If none of the options are selected (step S53, NO), the process returns to step S47 to continue monitoring of status.

When a document processing job is submitted by the image capture device without specifying the particular backend device, and a plurality of backend devices can perform the document processing job, the job distribution apparatus may determine an appropriate one of the backend devices to which the job will be routed. For example, the job distribution apparatus may ping each of the plural backend devices to determine those which are available for processing the job and obtain user authorization information, and then compare username to the user authorization information to determine whether the user is authorized to use the backend device.

An example of a process for processing a facsimile transmission job through one of plural facsimile servers will now be discussed with reference to FIG. 9.

A facsimile job submitted from a document capture device (for example, MFD) by a user is received by the job distribution apparatus (step S81). The job distribution apparatus retrieves a list of fax servers which the user is authorized to use to send a facsimile (step S82). Prior to retrieval of the list, a user authentication process is preferably performed. For example, the user may have an account on none, one or more than one of the fax servers in the system, as determined using the username included with the job. In addition, even if the user has an account, the user may have limited access, for example, restricted to receiving facsimiles. The user may be requested to supply username and password. A procedure may be called to determine the suitable ones amongst the fax servers in the system. The list may be presented in random order or preferably prioritized, such as according to a fixed order, capacity of the servers, jobs on queue at the servers, or other criteria.

If no fax servers are on the list (step S83, NO), a message is sent to the user (step S84), such as "USER DOES NOT HAVE PERMISSION" or "PLEASE CONTACT HELP DESK".

On the other hand, if one or more fax servers are on the list (step S83, YES), the devices on the list may be pinged in turn to query its availability (step S85). If the pinged fax server does not respond or an error is returned (step S86, NO) and other fax servers remain on the list (step S87, YES), the next fax server on the list is pinged (step S88). If no other fax servers remain on the list (step S87, NO), a message is sent to the user (step S89), such as "NO FAX SERVERS AVAILABLE." Alternatively, in place of steps S85-S89, all of the devices on the list may be pinged, and the job distribution apparatus connects to the first to respond.

If the fax server responds to indicate that it is available (step S86, YES), the job distribution apparatus submits the fax job to the fax server (step S90). If the job is not successfully created by the fax server (step S91, NO), an error message is sent (for example, by e-mail) to the user (step S92), such as "ERROR WHEN CREATING FAX JOB AT SERVER END."

If the job is successfully created by the fax server (step S91, NO), a message is sent to the user (step S93), such as "SUCCESSFUL CONNECTION TO FAX SERVER." Thereafter, the job distribution apparatus polls the fax server for status of the job at a regular interval (step S94). If the status is that the job has not yet completed (step S95, YES), the status (for example, "waiting", "dialing", "redialing", "retransmitting", etc.) is logged (step S96). If the job has been completed (step S95, YES), job completion is logged and a job completed message is sent to the user (step S97). If an error has been encountered in the job (step S95, error), the error is logged and an error message is sent to the user (step S98).

The above specific embodiments and examples are illustrative, and many variations can be introduced on these embodiments and examples without departing from the spirit of the disclosure or from the scope of the appended claims. For example, elements and/or features of different examples and illustrative embodiments may be combined with each other and/or substituted for each other within the scope of this disclosure and appended claims.

As another example, although the discussion above exemplarily refers to routing a document processing job from an image capture device to a backend, it should be understood that in some instances the job distribution apparatus can deliver a document to multiple backend devices, for example, to the e-mail and fax servers, to the OCR system, and to a document management system. Other combinations are of course possible.

Further, although ideally each system may be services by a single job distribution apparatus, multiple job distribution apparatuses may be networked together. For example, a job distribution apparatus may be mirrored by an additional job distribution apparatus to provided failover protection.

In addition, while the document processing job is submitted from the image capture device to the job distribution apparatus through a data communication network in several of the examples discussed herein, it should be apparent that alternatively, a data communication network need not be involved in the communication of the job from the image capture device to the job distribution apparatus. For example, the image capture device and the job distribution apparatus may be different components of an integrated package or device, and the network is replaced by a (Virtual or physical) transmission channel or medium. In such example, the virtual connection between the image capture device and the job distribution apparatus is terminated once the document processing job is forwarded from the image capture component to the job distribution component, and the job distribution component monitors the status of the job after it is forwarded to the backend. After the job distribution component receives status (or error) information from the backend, the job distribution component establishes a new connection to the image capture component and forwards the information to the image capture component.

What is claimed is:

1. A job distribution apparatus comprising:
a frontend interface for communication with one or more image capture devices through a data communication network;
a backend interface for communication with backend devices; and
a job communication controller configured to control said frontend interface and said backend interface for bi-directional status and control between image capture devices on the one hand and backend devices on the other hand,
wherein said job communication controller controls said frontend interface to receive a document processing job from an image capture device through a first connection between said image capture device and said job distribution apparatus through said data communication network, and controls said backend interface to route said document processing job to a specified backend device, and
wherein said job communication controller controls said frontend interface to terminate the first connection without waiting for acknowledgement or completion of the document processing job by the specified backend device, and transmit status information of said document processing job to said image capture device through a second connection between said image capture device and said job distribution apparatus, after said first connection is terminated.

2. The job distribution apparatus of claim 1, wherein said image capture device initiates the second connection, said job distribution apparatus receives a status request from said image capture device through said frontend interface via the second connection initiated by said image capture device, and said job communication controller controls said frontend interface to transmit said status information of said document processing job to said image capture device in response to the status request from the image capture device.

3. The job distribution apparatus of claim 1, wherein said job communication controller controls said backend interface to receive a status message of said document processing job from the specified backend device, and controls said frontend interface to establish said second connection with said image capture device.

4. The job distribution apparatus of claim 1, wherein said job communication controller controls said frontend interface to send a notice of completion of the document processing job by said specified backend device, to said image capture device through an additional connection between said job distribution apparatus and said image capture device.

5. The job distribution apparatus of claim 4, wherein said notice is provided through one of an e-mail, a facsimile and a message displayed on a display of said image capture device.

6. The job distribution apparatus of claim 1,
wherein said document processing job includes a first set of processing information,
wherein said job communication controller controls said frontend interface to transmit after the first connection has been terminated, a notice that the document processing job has failed to said image capture device through said second connection between said image capture device and said job distribution apparatus,
wherein said job distribution apparatus receives additional processing information from said image capture device through said second connection, after said notice that the document processing job has failed is transmitted to said image capture device, and
wherein said job communication controller controls said backend interface to send the document processing job to said specified backend device an additional time, in accordance with said additional processing information, without receiving the document processing job a second time from said image capture device.

7. The job distribution apparatus of claim 6, wherein the document processing job includes a document to be processed, said first set of processing information includes index information for the document, and said notice transmitted to said image capture device further includes an indication that the document processing job has failed because the index information for the document is invalid.

8. The job distribution apparatus of claim 7, wherein said additional processing information received by said job distribution apparatus from said image capture device includes replacement information for the index information that is invalid.

9. The job distribution apparatus of claim 6, wherein the document processing job includes a document to be processed, and said first set of processing information includes instructions for processing the document.

10. The job distribution apparatus of claim 6, wherein the first set of processing information from said image capture device includes at least one of a username and an identification of said image capture device.

11. The job distribution apparatus of claim 6, wherein said job communication controller controls said frontend interface to transmit to said image capture device, after it is determined that the document processing job has failed, further processing options for processing the document processing job, and said additional processing information received by said job distribution apparatus from said image capture device corresponds to one or more selected options.

12. The job distribution apparatus of claim 11, wherein said further processing options includes as a selectable option an instruction to said job distribution apparatus to retransmit said document processing job as is to the specified backend device again, without said job distribution apparatus receiving the document processing job from said image capture device said second time.

13. The job distribution apparatus of claim 11, wherein said further processing options includes as a selectable option an instruction to override said first set of processing information with said additional processing information, and retransmit said document processing job from said job distribution apparatus to the specified backend device a second time, without retransmitting the document processing job from said image capture device to said job distribution apparatus said second time.

14. The job distribution apparatus of claim 1, wherein the job communication controller controls said frontend interface to terminate the first connection, after the frontend interface receives the document processing job from the image capture device through the first connection, without waiting for acknowledgement or completion of the document processing job by the specified backend device.

15. A computer program stored in a program storage device readable by a computer and tangibly embodying a program of instructions executable by the computer, said computer program comprising:
- a job receiving part configured to receive a document processing job from an image capture device via a first connection between said image capture device and the computer on which the computer program is executing;
- a job routing part configured to route said document processing job to a specified backend device; and
- a job monitor part configured to terminate the first connection without waiting for acknowledgement or completion of the document processing job by the specified backend device, monitor a status of processing of the document processing job by the backend device, and transmit status information of said document processing job to said image capture device through a second connection between said image capture device and the computer on which the computer program is executing, after said first connection has terminated.

16. The computer program of claim 15, wherein the computer program executing on the computer proceeds to receive and route an additional job after said first connection terminates and without waiting for acknowledgement or completion of the initial document processing job.

17. The computer program of claim 15, further comprising:
- an additional processing part configured to transmit a notice that the document processing job has failed to said image capture device through said second connection between said image capture device and the computer on which said computer program is executing, after the first connection has been terminated,
- wherein said document processing job includes a first set of processing information, and
- wherein said additional processing part receives additional processing information from said image capture device after said notice has been transmitted, and sends the document processing job to said specified backend device an additional time in accordance with said additional processing information, without receiving the document processing job a second time from said image capture device.

18. The computer program of claim 17, further comprising a job storage part configured to store the document processing job, wherein after it is determined that the document processing job has failed, the stored document processing job is retrieved from said job storage part, and the document processing job is resubmitted by said job routing part to the specified backend device, in accordance with the additional processing information, without the computer on which said computer program is executing receiving the document processing job from said image capture device said second time.

19. A document processing system comprising:
- one or more image capture devices;
- one or more backend devices;
- a job distribution apparatus including a frontend interface for communication with one or more image capture devices through a data communication network, a backend interface for communication with backend devices, and a job communication controller configured to control said frontend interface and said backend interface for bi-directional status and control between the image capture devices on the one hand and the backend devices on the other hand,
- wherein said job communication controller controls said frontend interface to receive a document processing job from an image capture device through a first connection between said image capture device and said job distribution apparatus through said data communication network, and controls said backend interface to route said document processing job to a specified backend device, and
- wherein said job communication controller controls said frontend interface to terminate the first connection without waiting for acknowledgement or completion of the document processing job by the specified backend device, and transmit status information of said document processing job to said image capture device through a second connection between said image capture device and said job distribution apparatus, after said first connection is terminated.

20. The document processing system of claim 19,
- wherein said document processing job includes a first set of processing information,
- wherein said job communication controller controls said frontend interface to transmit after the first connection has been terminated, a notice that the document processing job has failed to said image capture device through said second connection between said image capture device and said job distribution apparatus,
- wherein said job distribution apparatus receives additional processing information from said image capture device through said second connection, after said notice that the document processing job has failed is transmitted to said image capture device, and
- wherein said job communication controller controls said backend interface to send the document processing job to said specified backend device an additional time, in accordance with said additional processing information, without receiving the document processing job a second time from said image capture device.

21. A method for bi-directional status and control between image capture devices on the one hand and backend devices on the other hand, comprising:
- routing by a job distribution node to a specified backend device a document processing job received from an image capture device through a first connection between the image capture device and the job distribution node;
- terminating the first connection without waiting for acknowledgement or completion of the document processing job by the specified backend device; and
- establishing a second connection between the image capture device and the job distribution node, and transmitting from the job distribution node through the second connection to the image capture device status information from the specified backend device of the document processing job.

22. The method of claim 21, further comprising waiting a predetermined period of time after the document processing job is received from the image capture device before establishing the second connection and transmitting the status information of the document processing job to the image capture device.

23. The method of claim 21, further comprising receiving a status message from the specified backend device, before establishing the second connection and transmitting the status information of the document processing job to the image capture device.

24. The method of claim 21, further comprising receiving by the job distribution node a status request from the image capture device through the second connection, wherein the second connection is initiated by the image capture device, and the status information of the document processing job is transmitted from the job distribution node to the image capture device in response to the status request from the image capture device.

25. The method of claim 21, further comprising sending from the job distribution node to the image capture device through an additional connection between the job distribution node and the image capture device, a notice of completion of the document processing job by the specified backend device.

26. A method for bi-directional status and control between image capture devices and backend devices, comprising:
routing a document processing job including a first set of processing information received by a job distribution node from an image capture device, to a specified backend device through a first connection between the image capture device and the job distribution node;
allowing the first connection to terminate without waiting for acknowledgement or completion of the document processing job by the specified backend device;
sending a notice from the job distribution node to the image capture device through a second connection between the image capture device and the job distribution node, after the first connection has been terminated, that the document processing job has failed;
receiving through the second connection additional processing information from the image capture device; and
sending from the job distribution node to the specified backend device the document processing job a second time, in accordance with the additional processing information, without receiving the document processing job again from the image capture device.

27. The method of claim 26, wherein the notice that the document processing job has failed further includes an indication that the document processing job has failed because at least a portion of the first set of processing information is invalid, and wherein the additional processing information from the image capture device replaces the at least a portion of the first set of processing information that is invalid.

28. The method of claim 27, further comprising determining by the job distribution node that at least a portion of the first set of processing information is invalid, and inserting in the notice that the document processing job has failed an indication that the document processing job has failed because at least a portion of the first set of processing information is invalid.

29. The method of claim 26, further comprising sending from the job distribution node to the image capture device, along with or after sending the notice that the document processing job has failed, further processing options for selection for processing the document processing job, and the additional processing information corresponds to one or more selected options.

30. The method of claim 29, wherein the further processing options includes as a selectable option instruction to the job distribution node to retransmit the document processing job as is from the job distribution node to the specified backend device a second time, without the job distribution node receiving the document processing job from the image capture device a second time.

31. The method of claim 29, wherein the further processing options includes as a selectable option an instruction to override the first set of processing information with the additional processing information, and retransmit the document processing job from the job distribution node to the specified backend device a second time, without the job distribution node receiving the document processing job from the image capture device a second time.

* * * * *